3,294,632
CONTROLLING BACTERIA ON TEXTILE MATERIALS WITH REACTION PRODUCTS OF TETRAKIS (ALPHA-HYDROXYORGANO) PHOSPHONIUM HALIDES COMBINED WITH FORMALDEHYDE SOURCE MATERIALS
George M. Wagner, Lewiston, N.Y., assignor to Hooker Chemical Corporation, Niagara Falls, N.Y., a corporation of New York
No Drawing. Filed Aug. 31, 1964, Ser. No. 393,407
13 Claims. (Cl. 167—38.6)

This invention relates to compositions and method for controlling bacteria and more particularly it relates to composition and methods useful in controlling bacteria on textile materials, which composition retain their anti-bacterial activities over prolonged periods of time.

In recent years the difficulty of controlling undesirable or harmful bacteria has been emphasized in the reports of numerous outbreaks of so-called "staph" infection. Frequently, such outbreaks have occurred in hospitals, nursing homes, and similar institutions, which normally employ extensive sterilization and disinfection of both the premises and the equipment used therein. Typical procedures used have included sterilization by heat and/or steam, and/or ultraviolet light, used principally with instruments, bedding, towels, gowns, and the like, and washing or scrubbing with strong disinfectant solutions, such as aqueous solutions of sodium hypochlorite, used primarily for walls, floors, fixtures, furnishings, and the like. That these outbreaks have frequently occurred in institutions which regularly use such sterilization and disinfecting procedures, emphasizes the fact that in the control of undesirable and/or harmful bacteria, it is not sufficient merely to kill the bacteria which are present at one particular time, but it is also desirable that the development of new bacterial growth also be prevented.

In the treatment of textile articles in particular, such as bedding, garments, towels, linens, and the like, it is desirable if these materials can be given a durable anti-bacterial treatment. While the use of heat, and/or steam, and/or ultraviolet light, is effective in killing or controlling the bacteria on such articles at the time of treatment, after the sterilization treatment, however, once these articles are exposed to the atmosphere, new bacterial growth begins substantially immediately. The treatment of such articles with disinfectant materials, in addition to the sterilization treatment, may be of some help in combating this problem. However, the residual anti-bacterial activity of such disinfectants is normally short lived, and, additionally, these disinfectant materials may impart an objectionable odor to the articles thus-treated. Moreover, these disinfectant materials are normally removed from the articles during launderings or washing so that frequent reapplication of the disinfectant, e.g., generally after each laundering, is necessary. Similarly, in the treatment of floors, walls, and the like, the problems of objectionable odor and non-durability of the anti-bacterial action of the disinfectant are also encountered.

It is, therefore, an object of the present invention to provide an improved process for controlling bacteria, which process is useful in the treatment of cellulosic materials, such as textiles.

Another object of the present invention is to provide an improved process for controlling bacteria which process utilizes compositions which impart a durable anti-bacterial activity to the surfaces treated.

These and other objects will become apparent to those skilled in the art from the description of the invention which follows.

Pursuant to the above objects, the present invention includes a method for controlling bacteria which comprises contacting the bacteria with a composition comprising the reaction product of a tetrakis(alpha-hydroxyorgano)phosphonium halide and a material capable of supplying formaldehyde, whereby the combination of the phosphonium halide and the formaldehyde source material effects a controlled release of formaldehyde from the reaction product and the relative amounts of the phosphonium halide and the formaldehyde source material are such that the amount of formaldehyde thus controllably released is sufficient to effect the desired control of the bacteria. In this manner, it has been found that the composition with which the bacteria are contacted has a durable anti-bacterial activity, which durability is retained even after repeated washings or launderings and even when using disinfectant or bleach materials, such as hypochlorite or perborate. Typically, the anti-bacterial composition comprising the reaction product of the phosphonium halide compound and the material capable of supplying formaldehyde may be deposited on and in the areas containing the bacteria to be controlled, in order to effect the desired contact between the composition and the bacteria.

The tetrakis(alpha-hydroxyorgano) phosphonium halide compound of the subject anti-bacterial composition may be further defined as a compound having the formula

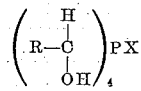

wherein R is selected from the group consisting of hydrogen, lower alkyls having between about 1 and about 6 carbon atoms, halogenated lower alkyls having between about 1 and about 6 carbon atoms, lower alkenyls having between about 1 and about 6 carbon atoms, halogenated lower alkenyls having between about 1 and about 6 carbon atoms, aryls having between about 5 and about 10 carbon atoms, halogenated aryls having between about 5 and about 10 carbon atoms, cycloalkyls having between about 3 and about 6 carbon atoms, halogenated cycloalkyls having between about 3 and about 6 carbon atoms, and X is a halogen such as chlorine, bromine, fluorine or iodine. Typical examples of suitable tetrakis(alpha-hydroxy organo) phosphonium halide compounds are tetrakis(hydroxymethyl)phosphonium chloride, tetrakis(hydroxymethyl)phosphonium bromide, tetrakis(hydroxyethyl)phosphonium chloride, tetrakis(alpha-hydroxypropyl)phosphonium chloride, tetrakis(alpha-hydroxy allyl)phosphonium chloride, tetrakis(alpha-hydroxy benzyl)phosphonium chloride, tetrakis(alpha-hydroxy methyl-cyclohexyl)phosphonium chloride, tetrakis(alpha-hydroxy propionyl)phosphonium chloride, tetrakis(alphahydroxybutanol)phosphonium chloride and mixtures thereof. Of these, the preferred phosphonium halide compound is tetrakis(hydroxymethyl)phosphonium chloride, and hereinafter, primary reference will be made to this material. This is not, however, to be taken as a limitation of the phosphonium halide compounds which may be used but merely as being exemplary of these materials.

Various formaldehyde source materials may be used in the composition of the present invention. Such materials are exemplified by formaldehyde itself; the water-soluble cyclic nitrogen containing compounds, such as triazines and the dimethylol cyclic alkylene ureas; and carbamic acid derivatives. Typical triazines which may be used include the methylolmelamines, such as mono, di, and trimethylolmelamine, modified methylolmelamines, such as the trimethyl ether of trimethylolmelamine, triazones, such as dimethylol triazone, and the like. Exemplary of cyclic alkylene ureas which may be used are dimethylol ethylene urea, dimethylol propylene urea, and the like. Exemplary of carbamic acid derivatives which may be used are urea, thiourea, biurete, ethylene urea, dicyandiamide, and the like. Additionally, resinous materials, such as urea-formaldehyde resin may also be used. It will be appreciated that these and other formaldehyde source materials may be used either separately or in combination, as for example, a mixture of trimethylolmelamine and urea.

The reaction product of the phosphonium halide compound and the material capable of supplying formaldehyde, as has been described hereinabove, are brought into contact with the bacteria to be controlled in an amount sufficient to provide the desired control of the bacteria, e.g., a bactericidal amount. Typically the reaction product is applied at a rate within the range of about 7 to about 25 grams per square meter of the surface to be treated, with rates within the range of about 10 to about 20 grams per square meter being preferred. It will be appreciated, however, that in many instances, either greater or lesser application rates may be used and still obtain satisfactory bacteria control as well as durability of the anti-bacterial activity of the material.

The anti-bacterial composition of the present invention is desirably applied to the area in which the bacteria is to be controlled as an aqueous suspension or solution containing the phosphonium halide compound in an amount within the range of about 5 to about 50 percent by weight of the aqueous composition and the formaldehyde source compound in an amount within the range of about 1 to about 30 percent by weight of the aqueous composition. Preferably, the aqueous composition contains the phosphonium halide compound, such as tetrakis(hydroxymethyl)phosphonium chloride, in an amount within the range of about 10 to about 40 percent by weight and the formaldehyde source material such as trimethylolmelamine and/or urea, in an amount within the range of about 5 to about 25 percent by weight.

The reaction of the phosphonium halide and the formaldehyde source material, e.g., by polymerization, to form the desired reaction product, may be effected either before or after the application of the aqueous composition to the area to be treated. Generally, the choice as to when the reaction is effected will depend upon the nature of the area being treated. For example, where the anti-bacterial composition is to be applied to textile articles, such as bedding, towels, garments, and the like, the reaction product may be formed after the application of the aqueous composition to these articles. Where, however, the control of bacteria is to be effected on less absorbent surfaces, such as walls, floors, and the like, it may be more convenient to effect the reaction of the phosphonium halide compound and the formaldehyde source material in the aqueous solution and apply the thus-formed reaction product to the surfaces to be treated.

The reaction of the phosphonium halide material and the formaldehyde source material may be effected by heating the reaction mixture, by contacting it with ammonia, ammonium hydroxide, or a compound capable of releasing ammonia in situ in the reaction mixture, or by a combination of both heat and ammonia treatment. In effecting the polymerization of the components of the reaction mixture by means of heat, temperatures within the range of about 90 to 160 degrees centigrade are typical.

When using a source of ammonia to effect the polymerization, there may be used ammonia gas; aqueous ammonia, including ammonium hydroxide; solutions of amino compounds containing at least two reactive hydrogen atoms per molecule, such as amines containing a primary amino group, hydrazine, alkyl-substituted hydrazine and the like; ammonium carbonate, or other readily dissociated weak acid salts of ammonia such as ammonium acetate, ammonium formate, and the like. Additionally, aqueous solutions of an ammonium salt of a strong acid, such as ammonium sulfate, with an alkali metal carbonate and an alkali metal bicarbonate, such as sodium carbonate and sodium bicarbonate may also be used. As has been indicated hereinabove, the polymerization of the phosphonium halide compound and the formaldehyde source material may be carried out by heating and/or contacting with the ammonia source the surface which has been treated with the aqueous reaction mixture. Alternatively, the reaction mixture may be heated and/or contacted with the ammonia source prior to application to the surface to be treated and, thereafter, the reaction product of the phosphonium halide compound and the formaldehyde source material may be applied to the area in which the bacteria is to be controlled.

In addition to the phosphonium halide compound and the formaldehyde source material, various other components may also be included in the composition with which the bacteria to be controlled are contacted. Typical materials which may be included include water dispersible tertiary amines, such as triethylamine, triethanolamine, triisopropylolamine, and the like; polyvinyl chloride resins, and particularly those having a softening point in excess of about 160 degrees centigrade; and antimony-containing compounds, such as antimony oxide. Other materials include primary and secondary amines, and nitrogen containing salts of strong acids, as described in U.S. Patent 3,101,278 and strong acid salts of magnesium, zinc, or tertiary amines, as described in U.S. Patent 3,101,279. Additionally, inorganic sulfites and bisulfites, such as ammonium sulfite, ammonium bisulfite, sodium sulfite, sodium bisulfite, potassium sulfite, potassium bisulfite, lithium sulfite, lithium bisulfite, calcium sulfite and bisulfite, barium sulfite and bisulfite, magnesium sulfite and mixtures of these may also be used. Tertiary amine sulfites such as the sulfites and bisulfites of triethanolamine, triisopropylamine, triethylamine, tripropanolamine, tributylamine, and the like, as well as reactive methylene compounds having acidic hydrogen, such as acetyl acetone, 1,3-cyclopentadione, and 1,3-cyclohexadione, and the like, may also be used. Alkaline inorganic stabilizers including alkaline oxides, hydroxides, carbonates, and bicarbonates, such as the alkali metal and alkaline earth metal oxides, carbonates, and bicarbonates may also be included in the antibacterial composition of the present invention. Additional materials which may be included in the composition are latexes containing a polyvinyl halide, such as polyvinyl chloride, and polyvinyl fluoride, as well as copolymers such as vinyl chloride-vinylidene chloride, vinyl chloride-vinyl acetate, and the like. Materials such as protective colloids, including polyvinyl alcohol, hydroxymethyl cellulose, hydroxyethyl cellulose and the like, acid catalysts, such as citric acid, wetting agents, and particularly the non-ionic type, such as the non-ionic oxyethylated alkyl phenols, and water repellants, such as silicones, wax emulsions, long chain nitrogen complexes, and the like, may also be included in the present composition.

Typical formulations wherein the above materials are included with the phosphonium halide compound and the formaldehyde source materials are as follows:

I

| Component: | Percent by weight |
|---|---|
| Tetrakis(alpha - hydroxyorgano) phosphonium halide compound | 6 to 20 |
| Water-soluble cyclic nitrogen-containing compound | 3 to 12 |
| Water-soluble tertiary amine | 1 to 4 |
| Urea | 3 to 12 |
| Polyvinyl chloride resin (dry basis) | 7 to 25 |
| Water | 45 to 80 |

II

| Component: | |
|---|---|
| Tetrakis(alpha - hydroxyorgano) phosphonium halide compound | 6 to 20 |
| Water soluble cyclic nitrogen-containing compound | 3 to 12 |

| Component: | |
|---|---|
| Water soluble tertiary amine | 1 to 4 |
| Urea or thiourea | 3 to 12 |
| High softening point polyvinyl chloride resin (dry basis) | 3 to 15 |
| Antimony oxide | 3 to 15 |
| Water | 45 to 80 |

III

| Component: | |
|---|---|
| Tetrakis(alpha - hydroxyorgano)phosphonium halide compound | 10 to 30 |
| Water soluble cyclic nitrogen-containing compound | 5 to 15 |
| Nitrogen-containing salt of a strong acid | 1 to 10 |
| Urea or thiourea | 0 to 10 |
| Sulfite compound | [1] 0.9 to 2 |
| Water | 40 to 80 |

[1] Moles per mole of phosphonium halide compound.

IV

| Component: | |
|---|---|
| Tetrakis(alpha - hydroxyorgano)phosphonium halide compound | 10 to 30 |
| Water soluble cyclic nitrogen-containing compound | 5 to 15 |
| Strong acid salt of magnesium zinc or tertiary amine | 1 to 10 |
| Urea or thiourea | 0 to 10 |
| Sulfite compound | [1] 0.9 to 2 |
| Nitrogen containing salt of strong acid | [2] 0 to 0.15 |
| Water | 35 to 70 |

[1] Moles per mole of phosphonium halide compound.
[2] Gram atoms of nitrogen in the salt per mole of the phosphonium halide compound.

V

| Component: | |
|---|---|
| Tetrakis(alpha - hydroxyorgano) phosphonium halide compound | 10 to 30 |
| Water soluble cyclic nitrogen-containing compound | 5 to 15 |
| Urea or thiourea | 1 to 10 |
| Water dispersible tertiary amine | 1 to 10 |
| Water | 35 to 80 |

VI

| Component: | |
|---|---|
| Tetrakis(alpha - hydroxyorgano)phosphonium halide compound | 10 to 40 |
| Water soluble cyclic nitrogen-containing compound | 5 to 15 |
| Carbamic acid derivative | 1 to 10 |
| Water | 35 to 80 |
| Alkaline inorganic stabilizer | [1] .25 to .75 |

[1] Equivalents of base per mole of phosphonium halide compound.

VII

| Component: | Percent by weight |
|---|---|
| Tetrakis(alpha - hydroxyorgano)phosphonium halide compound | 10 to 30 |
| Water dispersible tertiary amine | 2 to 10 |
| Vinyl halide containing latex | 10 to 50 |
| Urea-formaldehyde precondensate | 10 to 75 |
| Water | 45 to 85 |

VIII

| Component: | |
|---|---|
| Polyvinyl halide latex | 2 to 20 |
| Resin precondensate of tetrakis (alpha-hydroxy organo)phosphonium halide, urea and formaldehyde | 2 to 40 |
| Antimony oxide | 2 to 15 |
| Water | 45 to 85 |

It will be appreciated, of course, that there are many factors which will determine the choice of the particular anti-bacterial composition which is to be used. Exemplary of these factors but by no means all inclusive of them is the type of surface or area in which control of the bacteria is to be effected, e.g., its size, shape, material of construction and the like, as well as the desirability of imparting other characteristics to the material treated. For example, in this latter instance, in the treatment of textile materials, in addition to controlling bacteria in the material it may also be desirable to impart wrinkle resistance, flame retardancy, anti-static properties, and the like to the material. Accordingly, in each instance the compositions used will contain the necessary ingredients to achieve the desired result and will be applied in such a way and such amounts that the desired bacteria control as well as other desired functions, such as flame retardancy, will be achieved.

By the application of the anti-bacterial compositions of the present invention there is obtained effective control of bacteria over extended periods of time, even when the treated surfaces are subjected to washing or similar treatments which would normally destroy the antibacterial activity. Although it is not known for certain, it is believed that the antibacterial activity of the compositions of the present invention result from the release of formaldehyde by the formaldehyde releasing material, such as urea, trimethanolmelamine or the like, while the durability of this antibacterial activity is effected by the phosphonium halide compound, which in some manner, controls this release of formaldehyde and prevents its rapid dissipation even after washing of the treated area. Additionally, it is also possible that the phosphorus content of the phosphonium halide compound may add to the antibacterial activity of the present composition.

In order that those skilled in the art may better understand the present invention and the manner in which it may be practiced, the following specific examples are given. In these examples, in order to provide a more uniform test procedure and obtain a better comparison between the treated samples tested and the untreated control, the following procedure was used. The compositions to be tested for antibacterial activity were applied to a cellulosic textile fabric and the desired reaction product of the phosphonium halide compound and the formaldehyde source material was formed on the fabric by heating it for 1.5 minutes at 120 degrees centigrade, followed by heating for 1 minute at 138 degrees centigrade, followed by immersion in an aqueous solution containing 7 percent ammonium sulfate, 3 percent sodium carbonate and 6 percent sodium bicarbonate. Sample swatches, 1 inch in diameter, were then punched from the treated fabric as well as from similar fabrics which had not been treated. The remaining portions of each fabric, after removal of the sample swatches was then subjected to a prescribed number of washings, using the Standard American Institute of Laundrying Institutional Wash Procedure and a second set of 1 inch diameter sample swatches was then punched from the fabric. This procedure was repeated until test samples were obtained for each desired washing period. All of these test specimens, taken from the treated fabric and the corresponding control specimens taken from identical untreated fabric, were then prepared by placing them individually in sterile petri dishes. Each treated and each control swatch was then inoculated with approximately 20 X 10$^5$ of a 24 hour culture of the test organism. The inoculated specimen was then covered with an identical swatch of fabric in a sandwich-like arrangement, covered and placed in an incubator for various periods of time. Unless otherwise indicated, the temperature in the incubator was 37 degrees centigrade and the relative humidity was 75 percent. After incubation for the prescribed time period, the samples were aseptically removed from the petri dishes and placed in 50 milliliters of Letheen broth. The neutralizer-broth combination was vigorously swirled for 60 seconds and serial dilutions for each sample were prepared. Pour plates of the American Association of Textile and Colorists Bacteria Staphis Agar were prepared from each of these dilutions and the plates were incubated for periods of from 24 to 48 hours at 37 degrees centigrade. After the incubation period, the plates were counted and the percentage reduction for each organisms was calculated as follows:

$$\text{Percent reduction} = \frac{(\text{number of viable organisms on untreated control}) - (\text{number of viable organisms on treated sample})}{\text{number of viable organisms on untreated control}} \times 100$$

Each of these determinations was made five separate times and the means percent reduction was taken as the reduction attributable to the composition with which the fabric had been treated. The compositions used in treating the fabric were as follows:

A

| Component: | Percent by weight |
|---|---|
| Tetrakis(hydroxymethyl)phosphonium chloride (80/aqueous solution) | 27.3 |
| Trimethylolamine | 7.3 |
| Urea | 4.5 |
| Sodium carbonate | 4.2 |
| Water | 56.7 |

B

| | |
|---|---|
| Tetrakis(hydroxymethyl)phosphonium chloride (80% aqueous solution) | 30.3 |
| Urea | 4.8 |
| Sodium hydroxide (50% aqueous sol.) | 5.4 |
| Water | 59.5 |

C

| | |
|---|---|
| Tetrakis(hydroxymethyl)phosphonium chloride (80% aqueous solution) | 30.3 |
| Sodium hydroxide (50% aqueous sol.) | 5.4 |
| Trimethylolmelamine | 6.4 |
| Water | 57.9 |

D

| | |
|---|---|
| Trimethylolmelamine | 6.0 |
| Urea | 4.7 |
| Amine hydrochloride catalyst | 1.1 |
| Water | 88.2 |

E

| | |
|---|---|
| Trimethylolmelamine | 6.0 |
| Amine hydrochloride catalyst | 1.1 |
| Water | 92.9 |

F

| | |
|---|---|
| Urea-formaldehyde resin | 2.5 |
| Water | 96.5 |
| Amine hydrochloride catalyst | 1.1 |

G

| | |
|---|---|
| Tetrakis(hydroxymethyl)phosphonium chloride (80% aqueous solution) | 11.1 |
| Trimethylolmelamine | 6.7 |
| Urea | 3.3 |
| Triethanolamine | 3.3 |
| Latex of polyvinyl chloride having a softening point of 180° C. | 15.7 |
| Antimony oxide (80% aqueous dispersion) | 11.1 |
| Water | 48.3 |

H

| | |
|---|---|
| Tetrakis(hydroxymethyl)phosphonium chloride (80% aqueous solution) | 17 |
| Trimethylolmelamine | 12 |
| Urea | 5 |
| Sodium sulfite | 13 |
| Ammonium sulfate | 2 |
| Water | 51 |

Using these compositions and the procedures described hereinabove, the following results are obtained:

| Ex. | Composition Applied | Rate applied grams per sq. meter | Organism Treated | No. of washes | Contact time in hrs. | Mean percent reduction |
|---|---|---|---|---|---|---|
| 1 | A | 29 | Staphylococcus Aureus var. 80/81. | 1 | 1 | 96.18 |
| 2 | A | 22 | Same as 1 | 1 | 1 | 93.26 |
| 3 | A | 15 | Same as 1 | 1 | 1 | 94.72 |
| 4 | A | 29 | Same as 1 | 10 | 1 | 81.29 |
| 5 | A | 29 | Salmonella typhosa | 1 | 1 | 95.84 |
| 6 | A | 22 | Same as 5 | 1 | 1 | 94.20 |
| 7 | A | 15 | Same as 5 | 1 | 1 | 91.47 |
| 8 | A | 29 | Same as 5 | 10 | 1 | 84.75 |
| 9 | B | 10 | Same as 1 | 1 | 1 | 96.43 |
| 10 | B | 10 | Same as 1 | 10 | 1 | 92.37 |
| 11 | C | 22 | Same as 1 | 1 | 1 | 97.46 |
| 12 | C | 22 | Same as 1 | 10 | 1 | 83.44 |
| 13 | D | 5 | Same as 1 | 1 | 1 | 91.59 |
| 14 | D | 5 | Same as 1 | 10 | 1 | 22.30 |
| 15 | E | 5 | Same as 1 | 1 | 1 | 71.77 |
| 16 | E | 5 | Same as 1 | 10 | 1 | 41.22 |
| 17 | F | 1 | Same as 1 | 1 | 1 | 78.73 |
| 18 | F | 1 | Same as 1 | 10 | 1 | 28.78 |
| 19 | B | 10 | Same as 5 | 1 | 1 | 95.22 |
| 20 | B | 10 | Same as 5 | 10 | 1 | 91.64 |
| 21 | C | 22 | Same as 5 | 1 | 1 | 97.11 |
| 22 | C | 22 | Same as 5 | 10 | 1 | 80.98 |
| 23 | D | 5 | Same as 5 | 1 | 1 | 89.79 |
| 24 | D | 5 | Same as 5 | 10 | 1 | 21.84 |
| 25 | E | 5 | Same as 5 | 1 | 1 | 74.37 |
| 26 | F | 5 | Same as 5 | 10 | 1 | 41.82 |
| 27 | F | 1 | Same as 5 | 1 | 1 | 79.48 |
| 28 | F | 1 | Same as 5 | 10 | 1 | 30.63 |
| 29 | A | 27.6 | Same as 1 | 50 | 1 | 94.75 |
| 30 | A | 27.6 | Staphylococcus albus | 50 | 1 | 88.47 |
| 31 | A | 27.6 | Proteus vulgaris | 50 | 1 | 93.22 |
| 32 | A | 27.6 | Same as 5 | 75 | 1 | 89.73 |
| 33 | A | 27.6 | Streptococcus faecolis | 25 | 3 | 88.98 |
| 34 | A | 27.6 | Escherichia coli | 25 | 3 | 84.46 |
| 35 | A | 27.6 | Shigella dysenterial | 25 | 3 | 95.64 |
| 36 | A | 27.6 | Corynbacterium diphtherial | 25 | 3 | 87.88 |
| 37 | A | 27.6 | Diplococcus pneumonial | 25 | 3 | 87.79 |
| 38 | A | 27.6 | Pseudomonas aeruginosa | 25 | 3 | 88.78 |
| 39 | A | 27.6 | Bacillus ammoniogenes | 25 | 3 | 90.0 |

| Ex. | Composition Applied | Rate applied grams per sq. meter | Organism Treated | No. of washes | Contact time in hrs. | Mean percent reduction |
|---|---|---|---|---|---|---|
| 40 | A | 27.6 | Bacillus subtiles | 50 | 3 | 81.66 |
| 41 | A | 27.6 | Same as 1 | 5 | 1 | 98.6 |
| 42 | A | 27.6 | Same as 5 | 5 | 1 | 96.3 |
| 43 | A | 27.6 | Same as 1 | 25 | 1 | 98.2 |
| 44 | A | 27.6 | Same as 5 | 25 | 1 | 97.2 |
| 45 | A | 27.6 | Same as 1 | (¹) | 1 | 99.9 |
| 46 | A | 27.6 | Same as 5 | Same as 45 | 1 | 99.9 |
| 47 | A | 27.6 | Same as 1 | (²) | 1 | 98.9 |
| 48 | A | 27.6 | Same as 5 | Same as 47 | 1 | 98.5 |
| 49 | A | 27.6 | Same as 1 | (³) | 1 | 98.3 |
| 50 | A | 27.6 | Same as 5 | Same as 49 | 1 | 97.7 |
| 51 | A | 27.6 | Same as 1 | (⁴) | 1 | 98.2 |
| 52 | A | 27.6 | Same as 5 | Same as 51 | 1 | 98.8 |
| 53 | G | 27.6 | Same as 5 | None | 1 | 98.55 |
| 54 | G | 27.6 | Same as 1 | None | 1 | 90.98 |
| 55 | H | 27.6 | Same as 1 | None | 1 | 93.52 |

¹ 25 followed by bleaching with 5% hypochlorite.
² 25 followed by bleaching with sol. Cont. 2 oz./gal. perborate.
³ Same as 45 followed by 10 washes w/o bleaching.
⁴ Same as 47 followed by 10 washes w/o bleaching.

From the above examples it is seen that effective control over a variety of bacterial strains is obtained by contacting the bacteria with a composition which contains the reaction product of a phosphonium halide compound and a material capable of supplying formaldehyde and this bacteria control or antibacterial activity is retained over extended periods of time even when the areas treated with the composition have been subjected to numerous washings, both with and without bleaching. It is seen to be quite significant that when the compositions used do not contain the phosphonium halide compound, although in some instances there was a fair degree of initial bacteria control, these compositions did not have the durability, in terms of prolonged antibacterial activity, as do the compositions of the present invention.

While there have been described various embodiments of the invention, the compositions and methods described are not intended to be understood as limiting the scope of the invention, as it is realized that changes therewithin are possible and it is further intended that each element recited in any of the following claims is to be understood as referring to all equivalent elements for accomplishing the same results in substantially the same or equivalent manner, it being intended to cover the invention broadly in whatever form its principle may be utilized.

What is claimed is:

1. A method for controlling bacteria which comprises contacting the bacteria with a composition comprising the reaction product of a tetrakis(alpha-hydroxyorgano)phosphonium halide and a formaldehyde source material, which source material forms with the phosphonium halide a reaction product capable of releasing formaldehyde and is selected from the group consisting of formaldehyde, triazines, dimethylolcyclic alkylene ureas, carbamic acid derivatives, and urea-formaldehyde resins, the amount of said reaction product being sufficient to effect the desired control of the bacteria.

2. A method for controlling bacteria which comprises contacting the bacteria with a composition comprising a tetrakis(alpha-hydroxyorgano)phosphonium halide having the formula

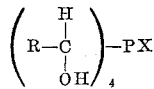

wherein R is selected from the group consisting of hydrogen, lower alkyls having between 1 and 6 carbon atoms, halogenated lower alkyls having between about 1 and about 6 carbon atoms, lower alkenyls having between 1 and about 6 carbon atoms, halogenated lower alkenyls having between about 1 and about 6 carbon atoms, aryls having between about 5 and about 10 carbon atoms, halogenated aryls having between about 5 and about 10 carbons, cycloalkyls having between about 3 and about 6 carbon atoms, and halogenated cycloalkyls having between about 3 and about 6 carbon atoms, and X is a halogen, and a formaldehyde source material, which source material forms with the phosphonium halide a reaction product capable of releasing formaldehyde, which source material is selected from the group consisting of formaldehyde, urea-formaldehyde resins, carbamic acid derivatives and water soluble cyclic nitrogen containing compounds selected from the group consisting of triazines and dimethylol cyclic alkylene ureas, said reaction product with which the bacteria is contacted being present in an amount sufficient to effect the desired control of the bacteria.

3. The method as claimed in claim 2 wherein the bacteria to be controlled are contacted with a cured composition comprising:

| | Percent by weight |
|---|---|
| Tetrakis(alpha - hydroxyorgano)phosphonium halide compound | 6 to 20 |
| Water soluble cyclic nitrogen-containing compound | 3 to 12 |
| Water soluble tertiary amine | 1 to 4 |
| Urea | 3 to 12 |
| Polyvinyl chloride resin (dry basis) | 7 to 25 |
| Water | 45 to 80 |

4. The method as claimed in claim 2 wherein the bacteria to be controlled are contacted with a cured composition comprising:

| | Percent by weight |
|---|---|
| Tetrakis(alpha - hydroxyorgano)phosphonium halide compound | 6 to 20 |
| Water soluble cyclic nitrogen-containing compound | 3 to 12 |
| Water soluble tertiary amine | 1 to 4 |
| Urea or thiourea | 3 to 12 |
| High softening point polyvinyl chloride resin (dry basis) | 3 to 15 |
| Antimony oxide | 3 to 15 |
| Water | 45 to 80 |

5. The method as claimed in claim 2 wherein the bacteria to be controlled are contacted with a cured composition comprising:

| | Percent by weight |
|---|---|
| Tetrakis(alpha - hydroxyorgano)phosphonium halide compound | 10 to 30 |
| Water soluble cyclic nitrogen-containing compound | 5 to 15 |
| Nitrogen-containing salt of a strong acid | 1 to 10 |
| Urea or thiourea | 0 to 10 |
| Sulfite compound | ¹ 0.9 to 2 |
| Water | 40 to 80 |

¹ Moles per mole of phosphonium halide compound.

6. The method as claimed in claim 2 wherein the bacteria to be controlled are contacted with a cured composition comprising:

| | Percent by weight |
|---|---|
| Tetrakis(alpha - hydroxyorgano)phosphonium halide compound | 10 to 30 |
| Water soluble cyclic nitrogen-containing compound | 5 to 15 |
| Strong acid salt of magnesium zinc or tertiary amine | 1 to 10 |
| Urea or thiourea | 0 to 10 |
| Sulfite compound | [1] 0.9 to 2 |
| Nitrogen containing salt of strong acid | [2] 0 to 0.15 |

[1] Moles per mole of phosphonium halide compound.
[2] Gram atoms of nitrogen in the salt per mole of the phosphonium halide compound.

7. The method as claimed in claim 2 wherein the bacteria to be controlled are contacted with a cured composition comprising:

| | Percent by weight |
|---|---|
| Tetrakis(alpha - hydroxyorgano)phosphonium halide compound | 10 to 30 |
| Water soluble cyclic nitrogen-containing compound | 5 to 15 |
| Urea or thiourea | 1 to 10 |
| Water dispersible tertiary amine | 1 to 10 |
| Water | 35 to 80 |

8. The method as claim in claim 2 wherein the bacteria to be controlled are contacted with a cured composition comprising:

| | Percent by weight |
|---|---|
| Tetrakis(alpha - hydroxyorgano)phosphonium halide compound | 10 to 40 |
| Water soluble cyclic nitrogen-containing compound | 5 to 15 |
| Carbamic acid derivative | 1 to 10 |
| Water | 35 to 80 |
| Alkaline inorganic stabilizer | [1] .25 to .75 |

[1] Equivalents of base per mole of phosphonium halide compound.

9. The method as claimed in claim 2 wherein the bacteria to be controlled are contacted with a cured composition comprising:

| | Percent by weight |
|---|---|
| Tetrakis(alpho-hydroxyorgano)phosphonium halide compound | 10 to 30 |
| Water dispersible tertiary amine | 2 to 10 |
| Vinyl halide containing latex | 10 to 50 |
| Urea-formaldehyde precondensate | 10 to 75 |
| Water | 45 to 85 |

10. The method as claimed in claim 2 wherein the bacteria to be controlled are contacted with a cured composition comprising:

| | Percent by weight |
|---|---|
| Polyvinyl halide latex | 2 to 20 |
| Resin precondensate of tetrakis(alpha-hydroxyorgano)phosphonium halide, urea and formaldehyde | 2 to 40 |
| Antimony oxide | 2 to 15 |
| Water | 45 to 85 |

11. The method as claimed in claim 2 wherein the said reaction product with which the bacteria are contacted is applied at a rate of at least about 10 grams per square meter of area to be treated.

12. The method as claimed in claim 11 wherein the said reaction product is applied at a rate within the range of about 10 to about 20 grams per square meter.

13. The method as claimed in claim 12 wherein the material applied is the reaction product of tetrakis(hydroxymethyl)phosphonium chloride, trimethylolmelamine, and urea.

References Cited by the Examiner

UNITED STATES PATENTS

| 2,937,207 | 5/1960 | Reuter et al. | 260—606.5 |
| 3,013,085 | 12/1961 | Buckler | 260—606.5 |
| 3,054,698 | 9/1962 | Wagner | 117—136 |
| 3,087,836 | 4/1963 | Dearborn | 117—136 |
| 3,101,278 | 8/1963 | Wagner et al. | 117—137 |
| 3,101,279 | 8/1963 | Wagner et al. | 117—137 |
| 3,146,212 | 8/1964 | Wagner et al. | 260—2 |
| 3,219,478 | 11/1965 | Wagner | 117—136 |
| 3,221,057 | 11/1965 | Gordon et al. | 260—606.5 |
| 3,243,391 | 3/1966 | Wagner | 260—15 |

FOREIGN PATENTS

| 623,764 | 4/1963 | Belgium. |
| 629,820 | 10/1963 | Belgium. |
| 951,988 | 3/1964 | Great Britain. |

OTHER REFERENCES

Chem. Abstracts 53, 1729f (1959).

LEWIS GOTTS, *Primary Examiner.*

S. K. ROSE, *Assistant Examiner.*

UNITED STATES PATENT OFFICE
CERTIFICATE OF CORRECTION

Patent No. 3,294,632  December 27, 1966

George M. Wagner

It is hereby certified that error appears in the above numbered patent requiring correction and that the said Letters Patent should read as corrected below.

Column 6, line 67, for "20×105" read -- 20×104 --; column 1 after line 13, insert -- Water----------35 to 70 --; line 45, for "(alpho-hydroxyorgano)" read -- (alpha-hydroxyorgano) --.

Signed and sealed this 28th day of November 1967.

(SEAL)
Attest:

Edward M. Fletcher, Jr.  
Attesting Officer

EDWARD J. BRENNER  
Commissioner of Patents